United States Patent Office 3,759,778
Patented Sept. 18, 1973

3,759,778
POLYURETHANE STRUCTURAL ADHESIVE
Charles E. McClung, Dayton, and David Gerald Glasgow, Centerville, Ohio, assignors to Monsanto Research Corporation, St. Louis, Mo.
No Drawing. Original application Mar. 24, 1969, Ser. No. 810,017, now abandoned. Divided and this application July 22, 1971, Ser. No. 165,373
Int. Cl. B32b 27/40; C08g 22/06; C09j 3/16
U.S. Cl. 156—331                       3 Claims

ABSTRACT OF THE DISCLOSURE

An adhesive composition comprising (a) an isocyanate-terminated prepolymer obtained by reaction of a polytetramethylene ether glycol and an unsymmetrical hindered aromatic diisocyanate, and (b) 4,4'-methylenebis(2-chloroaniline).

The invention described herein was made in the performance of work under a NASA contract and is subject to the provisions of Section 305 of the National Aeronautics and Space Act of 1958, Public Law 85-568 (72 Stat. 435; 42 U.S.C. 2457).

BACKGROUND OF THE INVENTION

This is a division of aplication of Ser. No. 810,017, filed Mar. 24, 1969, now abandoned.
This invention pertains to liquid polyurethane adhesive compositions and to a method of surface bonding with such polyurethane adhesives.
Previously, polyurethanes have been employed for bonding a variety of surfaces, including rubber to metal, plastic to metal, etc. Prior art references are extensive (see J. H. Saunders and K. C. Frisch, Polyurethanes: Chemistry and Technology, vol. II, Chapter XI. Adhesives, pp. 609–659).
However, metal-to-metal adhesives have not been firmly established in this field, and certain deficiencies have delayed their acceptance and exploitation. In certain applications such as for equipment to be used in outer space, it would be desirable to have adhesives of high lap shear tensile strength over a broad temperature range, e.g., −250° C. to +150° C. Likewise T-peel strengths of at least 20 pounds per inch width at −196° C. and +150° C. are desired but previously unattainable. Other desirable properties include a minimum pot life of two hours, bonding pressures of less than 15 pounds per square inch, and cure temperatures under 120° C.

SUMMARY OF THE INVENTION

An object of this invention is to provide an adhesive composition suitable for bonding metal-to-metal surfaces with high lap shear tensile strength over a broad temperature range. It is a further object to provide an adhesive capable of high metal-to-metal T-peel strengths at −196° C. to +150° C. It is still a further object to provide an adhesive composition having a useful pot life of at least two hours.
These and other objects hereinafter defined are met by the invention wherein there is provided a liquid, curable adhesive composition comprising (a) an isocyanate-terminated prepolymer obtained by the reaction of one molar proportion of a 500–1500 molecular weight polytetramethylene ether glycol with about two molar proportions of an unsymmetrical hindered diisocyanate selected from the group consisting of

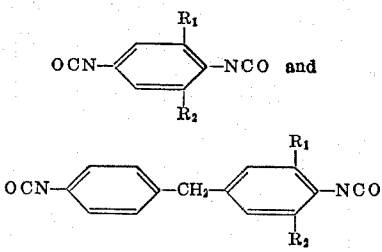

wherein $R_1$ and $R_2$ are lower alkyl groups of 1 to 8 carbon atoms, and (b) 4,4'-methylenebis(2-chloroaniline) in a $NCO/NH_2$ ratio of 1.0–1.3 to 1.0.

Polyurethanes prepared by curing isocyanate-terminated prepolymers with glycols are well-known and useful as coatings (e.g., Damusis and Frisch, U.S. Pat. 3,049,-513). Furthermore, isocyanate-terminated prepolymers utilizing unsymmetrical hindered diisocyanates are known (Case, U.S. Pat. 3,180,883). Other references disclose the use of polyurethanes as adhesives. However, none of these prior art references suggests the preparation of adhesive formulations meeting the objectives of the present invention, viz. high tensile strength and high T-peel strengths for metal-to-metal bonds over a broad temperature range, and long, useful pot life.

According to the present invention, one component of the adhesive composition is an isocyanate-terminated prepolymer obtained from an unsymmetrical hindered diisocyanate. Such a diisocyanate may be represented by the formulas:

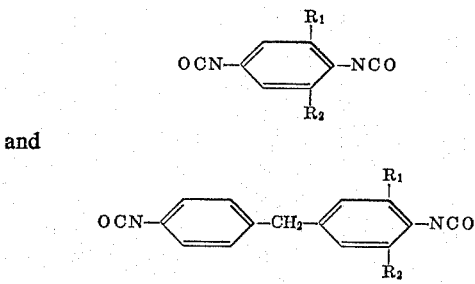

and

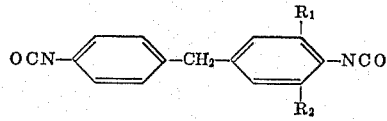

wherein $R_1$ and $R_2$ are lower alkyl groups of 1 to 8 carbon atoms. It is known that the two isocyanate groups in each molecule differ in reactivity, and that the one flanked by adjacent (ortho) substituents is considerably less reactive of the two. It is thus possible to react, preferentially, the more reactive isocyanate group by contacting the diisocyanate with a glycol at 50° C.; the product then contains terminal hindered isocyanate groups. Subsequently these hindered groups are caused to react with other components of the formulation by further heating (curing) at a higher temperature. Until such curing, however, a mixture of the components can be stored for at least several hours without undesirable premature gelation. Thus, the pot life of typical compositions prepared in the examples below will be seen to be greater than that of adhesives prepared from symmetrical diisocyanates.

Useful diisocyanates include 2,6-dimethyl-, 2,6-diethyl-, 2 - methyl-6-ethyl-, 2,6-di-n-propyl-, 2,6-di-n-hexyl-, and 2,6-di-n-octyl-p-phenylene diisocyanate, 3,5-dimethyl-, 3,5-diethyl-, 3-methyl-5-ethyl-, 3,5-di-n-amyl, 3,5-di-n-hexyl-, and 3,5 - di-n-octyl-4,4'-diisocyanatodiphenylmethane. A mixture of such isocyanate compounds may be employed.

The glycol employed in preparing the prepolymer is a polytetramethylene ether glycol of the general formula $$HOC_4H_8O(C_4H_8O)_nH$$

where $n$ is 5-20, with molecular weights in the range 500–1500. Although lower or higher molecular weight glycols will yields prepolymers, the resulting adhesive compositions would have inferior properties for metal-to-metal bonding throughout the broad temperature range. Although polypropylene ether glycols may be employed, the polytetramethylene ether glycols are preferred for optimum bonding and polymer strength.

As another component of the adhesive composition there is employed 4,4' - methylenebis(2-chloroaniline), which is reactive toward and forms a polymer with the abovedescribed prepolymer. It may be employed in nearly stoichiometric amounts corresponding closely to $NCO/NH_2=1.0$, but it has been found preferable to use a slight excess of the isocyanate, e.g., a $NCO/NH_2$ ratio of up to 1.3 to 1.0.

As other components there may be employed catalysts for accelerating the polyurethane-forming reaction, e.g., tertiary amines, organic tin compounds, etc.; fillers, e.g., glass fibers, nylon fibers, silica, magnetic particles, etc.; metal-bonding additives, e.g., $\gamma$-glycidoxypropyltrimethoxysilane; dyes or pigments.

Ordinarily the preparation of the metal surface is an important step in securing good adhesion. Thus, conventional etches with acid or alkaline baths are well known. In addition, the application of primers to improve adhesion to substrates is well known. In the present invention it has been found advantageous to use $\gamma$-glycidoxypropyltrimethoxysilane, either in hyrolyzed form, as a primer; or, in unhydrolyzed form, as a metal-bonding additive in the adhesive composition. As an additive it may be employed at up to 5% by weight of the total composition, preferably in the range 0.3–3.0%.

Generally the compositions are liquid at room temperature and therefore easily applied. However the higher molecular weight prepolymers may require warming to liquefy them before mixing and application. Although thinners and solvents are generally not necessary, they may be used for the more viscous compositions.

The application of the adhesive is done simply by coating the previously prepared metal sufaces; placing them together, preferably under a slight pressure of say, 5–10 pounds per square inch; maintaining the surfaces in this position for a few hours to a day at room temperature; and thereafter curing at a temperature of between 50° and 200° C., preferably about 110° C.

Although this adhesive is directed toward and useful for metal-to-metal bonding, it is also useful for bonding metal to glass, metal to wood, metal to plastics, wood to glass, etc. with proper surface preparation.

DESCRIPTION OF THE PREFERRED EMBODIMENTS

The invention is further illustrated by, but not limited to, the following examples.

Example 1

To illustrate the preparation of a prepolymer from 620 M.W. polyol, using a slight excess of diisocyanate.

To a dry nitrogen-swept reactor provided with a mechanical stirrer was charged 0.509 mole of 2,6-diethyl-p-phenylene diisocyanate (U.S. Pat. 3,180,883, Example 1). An atmosphere of nitrogen was maintained within the reactor. While the diisocyanate was stirred, there was added, in stages, 0.250 mole of a 620 molecular weight polytetramethylene ether ether glycol (e.g., "Polymeg 620," The Quaker Oats Company) so that the reaction temperature was maintained at about 50° C. by the exothermic reaction. Heat was supplied to the reactor for 2 hours after all of the glycol had been added and the exotherm subsided so that the temperature was held at 50° C. Finally, vacuum was applied to remove gases, and the prepolymer product was removed and stored under a nitrogen atmosphere. Analysis showed 8.087% NCO (ASTM Method D–1638) corresponding to a molecular weight of 1039.

Example 2

To illustrate the formulation of an adhesive.

The prepolymer of Example 1 was used. A mixture of 35 grams of prepolymer, 0.75 cc. of $\gamma$-glycidoxypropyl-trimethoxysilane, hereinafter referred to as "GPTS," (e.g., Z–6040, Dow-Corning Corp.), and 7.2 grams of molten, purified 4,4' - methylenebis - 2-chloroaniline ("MOCA") (e.g., MOCA, E. I. du Pont de Nemours and Co.), was prepared. This corresponds to a $NCO/NH_2$ ratio of 1.2:1. The MOCA was previously purified by distilling off impurities at 0.09 mm. Hg pressure and 190° C.

The adhesive mixture was applied to previously etched and primed aluminum panels, specifically Alclad Al 2014–T6 (Fed. Spec. QQ–A–255). Etching was in a chromic acid bath at 70° C. for 10 min. followed by a rinse in 0.1 N ferrous sulfate at room temperature for 30 seconds, and a rinse in deionized water. Priming was with a 1% alcoholic solution of N - ($\beta$ - aminoethyl)-$\gamma$-aminopropyltri-methoxysilane, hereinafter referred to as "AAPTS," (e.g., A–1120, Union Carbide Corp.) The adhesive was applied at a thickness of 7 mils. Pot life of the adhesive was about 2 hours, 15 min. as determined by observing the increase in viscosity with a Brookfield viscometer and referencing to MOCA-cured Adiprene L–100 as having one hour pot life. Lap joints had a half-inch overlap and were cured under 5 p.s.i. pressure. Curing was for 24 hours at room temperature followed by 24 hours at 110° C.

Physical testing consisted of a determination of tensile shear strength (MIL–A–005090 E (Wep), "Adhesives, Heat resistant, Airframe structural, metal to metal.") and T-peel strength (ASTM D 1876–61T, "Peel Resistance of Adhesives."). Physical test results were as follows, showing strengths determined at temperatures shown:

| Test temp. (° C.) | Tensile shear strength (p.s.i.) | T-peel strength (p.i.w.) |
| --- | --- | --- |
| −196 | 4,930 | 22.7 |
| +23 | 5,330 | 42.2 |
| +150 | 1,720 | 21.6 |

NOTE.—p.s.i.=pounds per square inch; p.i.w.=pounds per inch of width.

Example 3

To illustrate the preparation of a prepolymer from 620 M.W. polyol, using a slight deficiency of diisocyanate.

The procedure of Example 1 was employed except that 0.989 mole of 2,6-diethyl-p-phenylenediisocyanate was reacted with 0.500 mole of 620 molecular weight polytetramethylene ether glycol (Polymeg 620). The prepolymer product contained 7.745% NCO, corresponding to a molecular weight of 1085.

Example 4

To illustrate the formulation of an adhesive.

The prepolymer of Example 3 was used. A mixture of 25 grams of prepolymer, 0.125 cc. of GPTS, and 5.84 grams of MOCA was prepared ($NCO/NH_2$ ratio=1.05) and applied to aluminum test panels. The aluminum panels were etched as in Example 2, excluding ferrous sulfate rinse, and primed with a methanol solution of acid-hydrolyzed GPTS. The priming solution was prepared from 0.2 gram of GPTS shaken with 2 grams of 1% acetic acid for 10 min. and diluted with 100 grams of methanol. The adhesive was cured as in Example 2. Pot life of the adhesive was about 2 hrs., 15 min.

Physical test results were as follows:

| Test temp. (° C.) | Tensile shear strength (p.s.i.) | T-peel strength (p.i.w.) |
|---|---|---|
| −269 | 4,450 | |
| −196 | 5,120 | 21.1 |
| +23 | 5,580 | 26.5 |
| +150 | 1,780 | 21.4 |

Example 5

To vary the application of the adhesive.

The formulation of Example 4 was used, except that it was applied to panels that were etched as in Example 2 but not primed.

Physical test results were as follows:

| Test temp. (° C.) | Tensile shear strength (p.s.i.) | T-peel strength (p.i.w.) |
|---|---|---|
| −196 | 5,680 | 22.8 |
| +23 | 5,250 | 23.1 |
| +150 | 1,630 | 18.4 |

Example 6

To formulate and adhesive from a mixture of two types of prepolymers.

(A) A prepolymer based on 620 molecular weight polytetramethylene ether glycol was prepared as in Example 1, except that 0.50 mole of 2,6-diethyl-p-phenylene diisocyanate and 0.25 mole of the glycol (Polymeg 620) were used. The prepolymer product contained 8.07% NCO, corresponding to a molecular weight of 1041.

(B) A prepolymer based on 1020 molecular weight polytetramethylene ether glycol was prepared as in Example 1, from 0.20 mole of 2,6-diethyl-p-phenylene diisocyanate and 0.10 mole of the glycol (Polymeg 1020). The prepolymer product contained 5.83% NCO, corresponding to a molecular weight of 1441.

(C) An adhesive was formulated as follows: A mixture of 12.5 grams each of A and B above, 0.25 cc. of GPTS and 5.24 grams of MOCA was prepared (NCO/NH$_2$ ratio=1.05) and applied to aluminum test panels and cured as in Example 2. Pot life of the adhesive was about 2 hours.

Physical test results were as follows:

| Test temp. (° C.) | Tensile shear strength (p.s.i.) | T-peel strength (p.i.w.) |
|---|---|---|
| −196 | 5,530 | 44.3 |
| +23 | 5,300 | 45.0 |
| +150 | 1,640 | 37.9 |

Example 7

To formulate an adhesive from a prepolymer based on 3,5-diethyl-4,4′-diisocyanatodiphenylmethane.

(A) The prepolymer was prepared as in Example 1, except that 0.242 mole of 3,5-diethyl-4,4′-diisocyanatodiphenylmethane (U.S. Pat. 3,180,883, Example 4) and 0.125 mole of 1000 molecular weight polytetramethylene ether glycol (Polymeg 1000) were used. The prepolymer product contained 5.52% NCO, corresponding to a molecular weight of 1522.

(B) An adhesive was formulated as follows: A mixture of 20 grams of A above, 0.10 cc. of GPTS, and 3.34 grams of MOCA was prepared (NCO/NH$_2$ ratio=1.05) and applied to aluminum test panels as in Example 2. The panels had been etched, and then primed with a methanol solution of acid-hydrolyzed GPTS. The priming solution was prepared from 0.2 gram of GPTS shaken with 2 grams of 1% acetic acid for 10 min. and diluted with 100 grams of methanol. The adhesive was cured as in Example 2. Pot life of the adhesive was about 1 hr., 30 min.

Physical test results were as follows:

| Test temp. (° C.) | Tensile shear strength (p.s.i.) | T-peel strength (p.i.w.) |
|---|---|---|
| −196 | 6,220 | 40.4 |
| +23 | 3,700 | 69.3 |
| +150 | 1,280 | 23.5 |

Example 8

To formulate an adhesive from a prepolymer based on 2,6-dimethyl-p-phenylene diisocyanate.

(A) The prepolymer was prepared by a variation of the procedure used in Example 1: To 0.224 mole of the above diisocyanate (U.S. Pat. 3,180,883, Example 2) melted at 60° C. was added 0.111 mole of a 1020 molecular weight polytetramethylene ether glycol (Polymeg 1020). The reaction temperature was maintained at 50–57° C. during the addition and at 50° C. thereafter for 2 hours. Analysis showed 6.21% NCO corresponding to a molecular weight of 1353.

(B) An adhesive was formulated as follows: A mixture of 25.0 grams of A above, 0.125 cc. of of GPTS, and 4.685 grams of MOCA was prepared (NCO/NH$_2$ ratio=1.05) and applied to aluminum test panels as in Example 2, except that curing was at 74° C. for 72 hrs. Pot life of the adhesive was about 2 hrs., 20 min.

Physical test results were as follows:

| Test temp. (° C.) | Tensile shear strength (p.s.i.) | T-peel strength (p.i.w.) |
|---|---|---|
| −196 | 4,500 | 7.6 |
| +23 | 4,066 | 132.0 |
| +150 | 700 | 2.8 |

Example 9

To formulate an adhesive from a prepolymer based on the symmetrical diisocyanate, 3,3′-dimethyl-4,4′-diisocyanato diphenylmethane, as distinguishable from the use of an unsymmetrical diisocyanate in Examples 1–8.

(A) A prepolymer was prepared by a variation of the procedure used in Example 1: To 0.39 mole of the above diisocyanate (Aldrich Chemical Co.) at 50° C. was added 0.2 mole of a 1010 molecular weight polytetramethylene ether glycol (Polymeg 1010). Analysis of the prepolymer product showed 4.93% NCO corresponding to a molecular weight of 1705.

(B) An adhesive was formulated as follows. A mixture of 25.0 grams of A above, 0.25 cc. of GPTS, and 3.72 grams of MOCA was prepared (NCO/NH$_2$ ratio=1.05) and applied to aluminum test panels as in Example 2 excluding ferrous sulfate rinse. Pot life of the adhesive was about 34 min.

Physical test results were as follows:

Test temp. (° C.) _____ +150
Tensile shear strength (p.s.i.) _____ 910
T-peel strength (p.i.w.) _____ 30.5

Example 10

To formulate an adhesive for a prepolymer based on the symmetrical hindered diisocyanate, 3,3′,5,5′-tetraethyl-4,4′ - diisocyanato - diphenylmethane, as distinguishable from the use of an unsymmetrical hindered diisocyanate in Examples 1–8.

(A) A prepolymer was prepared by a variation of the procedure used in Example 1: To 0.2 mole of the above diisocyanate (British Pat. 852,651; Chemical Abstracts 55, 10942h (1961)) at 50–55° C. was added 0.1 mole of a 620 molecular weight polytetramethylene ether glycol (Polymeg 620). After the addition, stirring was continued for 2 hours at 50–55° C. Analysis of the prepolymer product showed 6.14% NCO corresponding to a molecular weight of 1369.

(B) An adhesive was formulated as follows. A mixture of 25.0 grams of A above, 0.125 cc. of GPTS, and 4.63 grams of MOCA was prepared (NCO/NH$_2$ ratio=1.05) and applied to aluminum test panels as in Example 2, excluding the ferrous sulfate rinse. The adhesive was cured at 74° C. for 72 hours. Pot life of the adhesive was less than 20 min.

Physical test results were as follows:

| Test temp. (° C.) | Tensile shear strength (p.s.i.) | T-peel strength (p.i.w.) |
| --- | --- | --- |
| −196 | 860 | 6.4 |
| +23 | 2,720 | 4.4 |
| +150 | 540 | 0.6 |

What we claim is:

1. The method of bonding solid metal surfaces together which comprises;
   (a) coating at least one of the surfaces with the curable adhesive composition comprising (i) an isocyanate-terminated prepolymer obtained by the reaction of one molar proportion of a 500–1500 molecular weight polytetramethylene ether glycol with about two molar proportions of an unsymmetrical hindered diisocyanate selected from the group consisting of

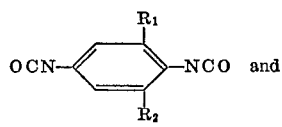 and

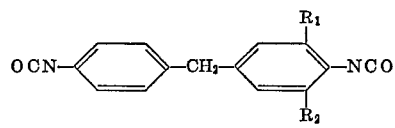

wherein R$_1$ and R$_2$ are lower alkyl groups of 1 to 8 carbon atoms, and (ii) 4,4′-methylenebis(2-chloroaniline) in a NCO/NH$_2$ ratio of 1.0–1.3 to 1.0,
   (b) placing together the two surfaces to be bonded,
   (c) maintaining the adhesive at 20–30° C. for about 24 hours, and
   (d) finally curing the adhesive by heating at a temperature above 30° C. and below the decomposition temperature of the adhesive.

2. The method of claim 1 in which the curing temperature is within the range 50–200° C.

3. The method of claim 1 in which the metal is substantially aluminum.

References Cited
UNITED STATES PATENTS

| | | | |
| --- | --- | --- | --- |
| 3,133,853 | 5/1964 | Knox | 161—190 X |
| 3,180,883 | 4/1965 | Case | 260—77.5 AT |
| 3,503,934 | 3/1970 | Chilvers | 156—331 X |
| 3,558,408 | 1/1971 | Hamilton et al. | 156—331 X |
| 3,558,422 | 1/1971 | Hamilton et al. | 156—331 X |
| 3,640,938 | 2/1972 | Finelli | 156—331 X |
| 3,703,426 | 11/1972 | Larson et al. | 156—331 X |

HAROLD ANSHER, Primary Examiner

U.S. Cl. X.R.

161—190, 219; 260—75 NT, 75 TN, 77.5 TB